United States Patent Office
3,833,691
Patented Sept. 3, 1974

3,833,691
2-(O,S-DILOWER ALKYL-THIOLPHOSPHORYL) DIPHENYL ETHERS
Paul Rathgeb, Basel, Switzerland, assignor to Ciba-Geigy Corporation, Ardsley, N.Y.
No Drawing. Filed June 20, 1973, Ser. No. 371,905
Claims priority, application Switzerland, June 23, 1972, 9,529/72; May 22, 1973, 7,290/73
Int. Cl. A01n 9/36; C07f 9/16
U.S. Cl. 260—951          10 Claims

ABSTRACT OF THE DISCLOSURE

New diphenyl ethers of the formula

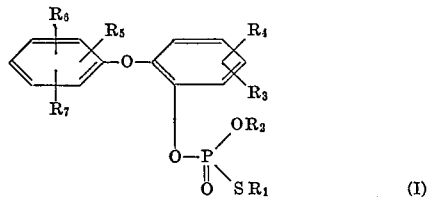

(I)

wherein $R_1$ represents alkyl with 1 to 4 carbon atoms, $R_2$ represents methyl or ethyl, $R_3$, $R_4$, $R_5$, and $R_6$ represent hydrogen, chlorine, or bromine, and $R_7$ represents hydrogen, chlorine, or nitro and their use for combating insects and members of the order Acarina are disclosed.

The present invention relates to organic phosphorus compounds, processes for their manufacture, and to their use in pest control.

The phosphorus compounds have the formula

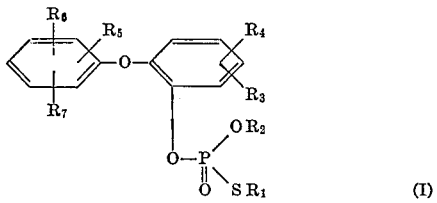

(I)

wherein $R_1$ represents alkyl with 1 to 4 carbon atoms, $R_2$ represents methyl or ethyl, $R_3$, $R_4$, $R_5$, and $R_6$ represent hydrogen, chlorine, or bromine, and $R_7$ represents hydrogen, chlorine, or nitro.

The alkyl groups represented by $R_1$ can be straight-chain or branched. Examples of such groups include: methyl, ethyl, n-propyl, n-butyl, i-, sec. or tert. butyl.

Preferred compounds on account of their action are those of the formula I, wherein $R_1$ represents n-propyl, isobutyl, or sec. butyl, $R_2$ represents methyl or ethyl, $R_3$, $R_4$, $R_5$, and $R_6$ represents hydrogen, chlorine, or bromine, and $R_7$ represents hydrogen, chlorine, or nitro.

The compounds of the formula I can be manufactured by the following known methods:

(1a)
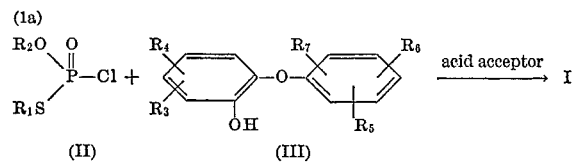

(1b)
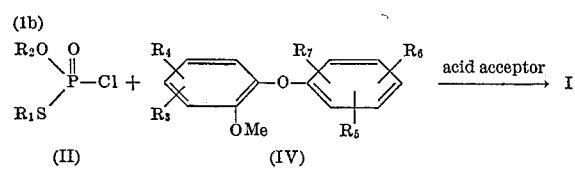

In the formulae II, III, and IV, $R_1$ to $R_7$ have the meanings given for the formula I and Me represents an alkali metal, in particular sodium or potassium, or represents an ammonium group, e.g. the group

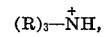

in which R represents hydrogen or alkyl with 1 to 4 carbon atoms.

(2)
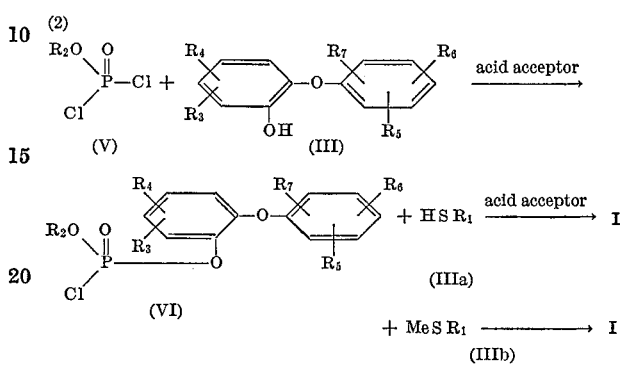

In the formulae II, IIIa, IIIb, V, and VI, $R_1$ to $R_7$ have the meanings given for the formula I and Me represents an alkali metal, in particular sodium or potassium, or represents the group

in which R represents hydrogen or alkyl with 1 to 4 carbon atoms.

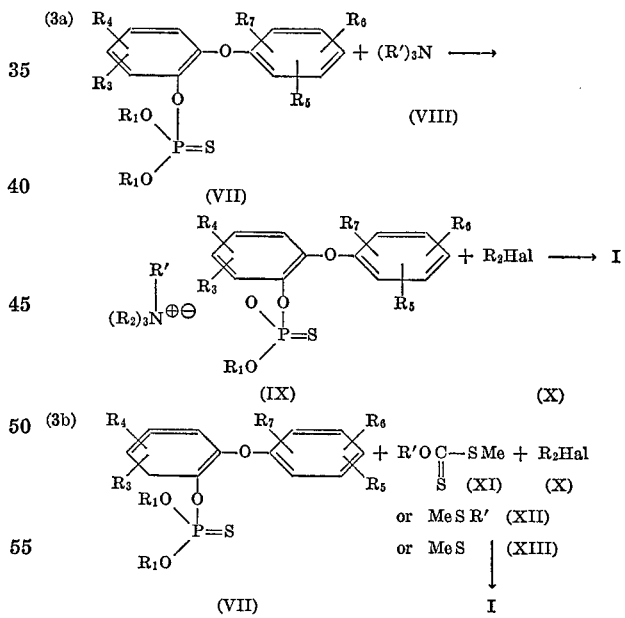

In the formulae VII or XIII, $R_1$ to $R_7$ have the meanings given for the formula I, Me represents an alkali metal, in particular sodium or potassium, or represents the group

in which R represents hydrogen or alkyl, R' represents an alkyl radical, and Hal represents a halogen atom, for example chlorine, bromine, or iodine.

Suitable acid acceptors are: tertiary amines, e.g. trialkylamine, pyridines, dialkyl anilines; inorganic bases, e.g. hydrides, hydroxides; carbonates and bicarbonates of alkali metals and alkaline earth metals. It is sometimes necessary to use catalysts in the reactions, for example copper or copper chloride. Processes 1a and 1b, 2, 3a, and 3b are carried out at a reaction temperature between —20° C. and 130° C., at normal pressure, and in solvents or diluents.

Examples of suitable solvents or diluents are: ether and ethereal compounds, e.g. diethyl ether, dipropyl ether, dioxan, tetrahydrofuran; amides, e.g. N,N-dialkylated carboxylic acid amides; aliphatic, aromatic, and halogenated hydrocarbons, in particular benzene, toluene, xylene, chloroform, chlorobenzene; nitriles, e.g. acetonitrile; dimethyl sulphoxide; ketones, e.g. acetone, methyl ethyl ketone; water. Ethanol is also suitable for processes 3a and 3b.

The starting materials of the formulae II, III, IV, V, and VII can be manufactured by methods analogous to known ones. The compounds of the formula I can be used for combating the most diverse kinds of animal and plant pests.

In particular they are suitable for combating all development stages, for example, eggs, larvae, pupae, nymphs, and adults of insects of the families:

Blattidae, Gryllidae, Gryllotalpidae, Tettigoniidae, Cimicidae Phyrrhocoridae, Reduviidae, Aphididae, Diaspididae, Pseudococcidae, Chrysomelidae, Coccinellidae, Bruchidae, Scarabaeidae, Dermestidae, Tenebrionidae, Tineidae, Noctuidae, Lymantriidae, Pyralidae, Culicidae, Tipulidae, Stomoxydae, Muscidae, Calliphoridae, Trypetidae, Pulicidae, as well as Acaridae of the families:

Ixodidae, Argasidae, Tetranychidae, Dermanyssidae.

By addition of other insecticides and/or acaricides, for example those listed in German Offenlegungsschrift 2,248,307, pages 6 to 10, it is possible to improve substantially the insecticidal or acaricidal action and to adapt it to given circumstances. Related compounds are described in Swiss Pat. 500,230. Compared with these, the compounds of the formula I possess substantially better activity against spider mites.

The compounds of the formula I may be used as pure active substance or together with suitable carriers and/or additives. Suitable carriers and additives can be solid or liquid and correspond to the substances conventionally used in formulation technique such, for example, as solvents, dispersants, wetting agents, adhesives, thickeners, binders and/or fertilisers.

For application, the compounds of the formula I may be processed to dusts, emulsion concentrates, granules, dispersions, sprays, to solutions, or suspensions, in the conventional formulation which is commonly employed in application technology.

The agents according to the invention are manufactured in known manner by intimately mixing and/or grinding active substances of the formula I with the suitable carriers, optionally with the addition of dispersants or solvents which are inert towards the active substances. The active substances can take, and be used in, the application forms described in German Offenlegungsschrift 2,248,307, pages 12 to 18.

EXAMPLE 1

While stirring, 41 g. of O-ethyl-S-n-propylthiolphosphoric chloride in 60 ml. of diethyl ether are added dropwise to a solution cooled to 10° C. of 58 g. of 4,2',4'-trichloro-2-hydroxy-diphenyl ether and 22 g. of triethylamine in 500 ml. of absolute diethyl ether so rapidly that the temperature does not exceed 30° C. Stirring is continued for 2 hours at 20–25° C. and the mixture is treated with further stirring, with 300 ml. of ice water. The organic phase is isolated, shaken once with water and twice with ice cold 2% sodium hydroxide solution, and then washed neutral with water. The ethereal phase is then treated with activated charcoal, filtered, dried, and the solvent is evaporated. The above residue is dried for 3 hours at 70° C. and 0.1 Torr to give the compound of the formula

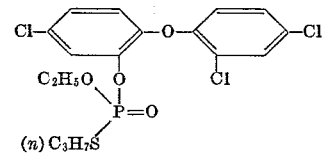

as a yellowish, non-distillable, viscous oil.

$n_D^{20} = 1.5737$

The following compounds are also manufactured in analogous manner:

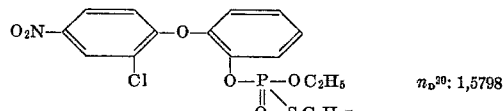  $n_D^{20}: 1,5798$

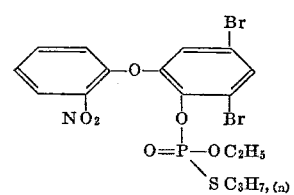

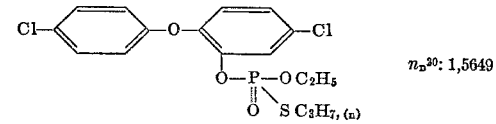  $n_D^{20}: 1,5649$

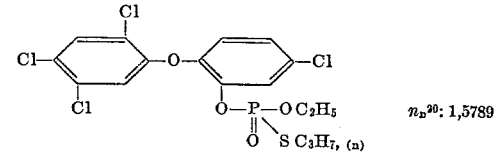  $n_D^{20}: 1,5789$

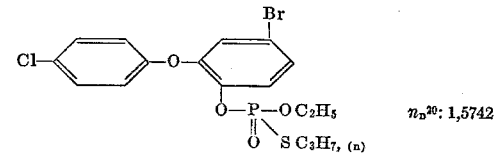  $n_D^{20}: 1,5742$

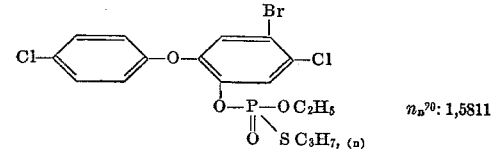  $n_D^{20}: 1,5811$

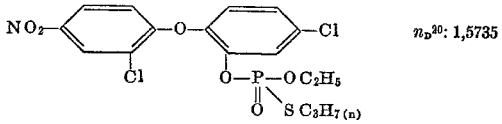  $n_D^{20}: 1,5735$

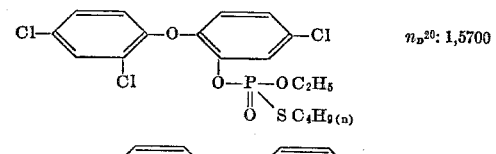  $n_D^{20}: 1,5700$

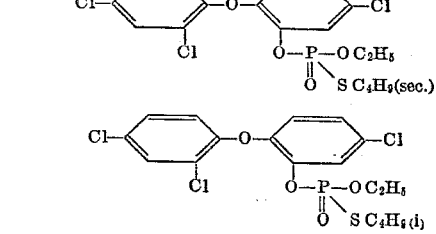

EXAMPLE 2

(A) Insecticidal ingest poison action

Tobacco and potato plants were sprayed with a 0.05% aqueous emulsion (obtained from a 10% emulsifiable concentrate). After the coating had dried, the tobacco plants were populated with *Spodoptera littoralis* larvae $L_3$ or *Heliothis virescens* larvae $L_3$ and the potato plants with Colorado potato beetle larvae (*Leptinotarsa decemlineata*). The test was carried out at 24° C. and 60% relative humidity. In the above test, the compounds according to Example 1 exhibited good ingest poison action against *Spodoptera littoralis, Heliothis virescens* and *Leptinotarsa decemlineata*.

(B) Insecticidal contact action

Broad beans (*Vicia faba*) reared in pots were infected with about 200 leaflice (*Aphis fabae*) per plant one day before the application. A spray broth in a concentration of 1000 p.p.m. (prepared from a 25% wettable powder) was applied to the leaves populated with lice using a compressed air spray. Evaluation took place 24 hours after the application. In the above test, the compounds according to Example 1 exhibited good contact action against *Aphis fabae*.

EXAMPLE 3

Acaricidal Action

(A) Action against *Tetranychus urticae*

*Phaseolus vulgaris* (dwarf beans) had an infested piece of leaf from a mass culture of *Tetranychus urticae* placed on them 22 hours before the test for the acaricidal action. The mobile stages which have migrated were sprayed with the emulsified test preparations in a concentration 400 p.p.m. from a chromatography atomiser so that the spray broth did not run off. The number of living and dead larvae, adults and eggs were evaluated after 2 to 7 days under a stereoscopic microscope and the result expressed in percentages. During the "waiting" the treated plants were kept in greenhouse compartments at 25° C.

The compounds according to Example 1 exhibited good action in the above test against eggs, larvae and adults of *Tetranychus urticae*.

(B) Action against *Tetranychus cinnabarinus*

(1) Residual action of 2 day coatings on adult females.—Two-leaf beans (*Phaseolus vulgaris*) were treated with an emulsion of the active substance in a concentration of 100 p.p.m. and populated 48 hours later with adult females. The percentage kill was determined 5 days afterwards.

(2) Contact action on larvae.—Adult females were transferred to two-leaf beans and left there for 24 hours for oviposition. They were then removed. The larvae hatched from the eggs were sprayed with an emulsion of the active substance in a concentration of 100 p.p.m. and the percentage evaluation of the kill was carried out 5 days later.

(3) Contact action on 24 hour old eggs.—The test for ovicidal action was carried out exactly according to the larvicidal test described in (2), except that the emulsion of the active substance in the concentration of 100 p.p.m. was sprayed on the 24 hour old eggs and the percentage kill was determined 6 days later.

In the above test, the compounds according to Example 1 exhibited evidence of good action against adults, larvae, and eggs of *Tetranychus cinnabarinus*.

I claim:

1. Compounds of the formula

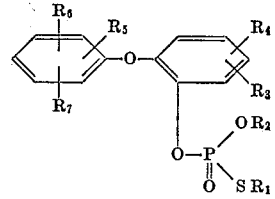

wherein $R_1$ represents alkyl with 1 to 4 carbon atoms, $R_2$ represents methyl or ethyl, $R_3$, $R_4$, $R_5$, and $R_6$ represent hydrogen, chlorine, or bromine, and $R_7$ represents hydrogen, chlorine, or nitro.

2. Compounds according to claim 1, wherein $R_1$ represents n-propyl, isobutyl, or sec. butyl, $R_2$ represents methyl or ethyl, $R_3$, $R_4$, $R_5$, and $R_6$ represent hydrogen, chlorine, or bromine, and $R_7$ represents hydrogen, chlorine, or nitro.

3. 4,2',4'-trichloro - 2 - (O-ethyl-S-n-propyl-thiolphosphoryl)-diphenyl ether, according to claim 2.

4. 4,4'-dichloro - 2 - (O-ethyl-S-n-propyl-thiolphosphoryl)-diphenyl ether, according to claim 2.

5. 4'-nitro-2'-chloro - 2 - (O-ethyl-S-n-propyl-thiolphosphoryl)-diphenyl ether, according to claim 2.

6. 4,2',4',5'-tetrachloro - 2 - (O-ethyl-S-n-propyl-thiolphosphoryl)-diphenyl ether, according to claim 2.

7. 3-bromo - 4' - chloro - 2 - (O-ethyl-S-n-propyl-thiolphosphoryl)-diphenyl ether, according to claim 2.

8. 3-bromo-4,4'-dichloro-2-(O - ethyl-S-n-propyl-thiolphosphoryl)-diphenyl ether, according to claim 2.

9. 4,2',4'-trichloro-2-(O-ethyl - S - sec.butyl-thiolphosphoryl)-diphenyl ether, according to claim 2.

10. 4,2',4'-trichloro-2-(O-ethyl - S - isobutyl-thiolphosphoryl)-diphenyl ether, according to claim 2.

References Cited

UNITED STATES PATENTS 3,280,227   10/1966   Mitchell et al. _____ 260—951

ANTON H. SUTTO, Primary Examiner

U.S. Cl. X.R.

424—217